US006373686B1

(12) United States Patent
Ogawa et al.

(10) Patent No.: US 6,373,686 B1
(45) Date of Patent: Apr. 16, 2002

(54) KEY PROTECTION STRUCTURE FOR AN ELECTRONIC APPARATUS

(75) Inventors: Tadahiko Ogawa; Hajime Takakuwa; Hiroyuki Yamamoto; Kiyotaka Tomioka, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/639,994

(22) Filed: Aug. 16, 2000

(30) Foreign Application Priority Data

Aug. 23, 1999 (JP) .......................................... 11-235539

(51) Int. Cl.[7] .................................................. H02B 1/04

(52) U.S. Cl. ....................... 361/601; 361/605; 361/608; 361/609; 200/50.06; 200/51 R; 211/26

(58) Field of Search ................................ 361/600, 601, 361/605, 608, 609, 615, 616, 640, 641; 200/50 A, 50 AA, 50 R, 51 R, 50.06; 211/26.41; 439/310, 535, 362, 364; 382/103; 16/383; 24/150 R, 136 R, 136 L, 303

(56) References Cited

U.S. PATENT DOCUMENTS 4,527,310 A * 7/1985 Vandebult ................. 24/150 R
4,602,136 A * 7/1986 Deneke et al. ............ 200/50 A
5,495,388 A * 2/1996 Bonetti et al. .............. 361/609

FOREIGN PATENT DOCUMENTS

DE 004034609 A1 * 5/1992 .......... H01H/25/06
FR 2631160 9/1994

* cited by examiner

*Primary Examiner*—Leo P. Picard
*Assistant Examiner*—Michael Datskovsky
(74) *Attorney, Agent, or Firm*—Morrison & Foerster LLP

(57) ABSTRACT

An object is to provide a key protection structure for an electronic apparatus which can prevent a preset value of a switch from being intentionally changed by the user or the like.

When setting of a first switch 21 is ended, a tool shutter operation portion 72 of a lock key 70 is inserted into a first shutter operation hole 61. The tool shutter operation portion 72 is then engaged with an engaging recess 45 of a first shutter 40. Thereafter, the lock key 70 is rotated, so that the first shutter 40 is rotated. A covering portion 44 of the shutter is therefore moved immediately above the first switch 21 to close a first switch operation hole 58, whereby the first switch 21 can be locked (key-protected) so as not to be externally operated.

7 Claims, 11 Drawing Sheets

PRIOR ART

KEY PROTECTION STRUCTURE FOR AN ELECTRONIC APPARATUS

BACKGROUND OF THE INVENTION

1. Field of the Invention

The present invention relates to a key protection structure for an electronic apparatus including an electronic control device such as a timer or a temperature controller.

2. Conventional Art

In a conventional electronic apparatus, as shown in FIG. 15, an operation section 200 is disposed in the front face. The operation section 200 is configured by a switch unit (not shown) and a front cover 209. The switch unit comprises first, second, and third switches 210, 211, and 212, and a printed circuit board (not shown) on which electronic parts are mounted and a conductor pattern (not shown) is formed.

In a face 209*a* of the front cover 209, a first switch operation hole 213 and an arcuate display window 213A, a second switch operation hole 214, and a third switch operation hole 215 are formed. The second and third switch operation holes 214 and 215 have rectangular display windows 214A and 215A, respectively.

In the first switch operation hole 213, a setting knob member 216 disposed on an operation shaft (not shown) of the first switch 210 is placed so as to forward protrude from the face 209*a* of the front cover 209. In the second switch operation hole 214, a setting knob member 217 disposed on an operation shaft (not shown) of the second switch 211 is placed so as to forward protrude from the face 209*a* of the front cover 209. In the third switch operation hole 215, a setting knob member 218 disposed on an operation shaft (not shown) of the third switch 212 is placed so as to forward protrude from the face 209*a* of the front cover 209.

When setting is to be performed through the first, second, or third switch 210, 211, or 212, therefore, the worker rotates or operates the setting knob member 216, 217, or 218.

In the operation section 200 used in another conventional electronic apparatus, as shown in FIG. 16, the setting knob members 216, 217, and 218 are not disposed in the first, second, and third switches 210, 211, and 212, and cross grooves 219, 220, and 221 may be disposed in the centers of knobs (not shown) of the first, second, and third switches 210, 211, and 212, respectively. The cross groove 219 of the first switch 210 is operably positioned in the first switch operation hole 213 of the front cover 209. The cross groove 220 of the second switch 211 is operably positioned in the second switch operation hole 214. The cross groove 221 of the third switch 212 is operably positioned in the third switch operation hole 215.

When setting is to be performed through the first, second, or third switch 210, 211, or 212, therefore, a tool (not shown) having an operation portion (not shown) in which an engaging projection (not shown) of a cross shape is formed at the tip end is used. Specifically, the operation portion of the tool is inserted into the first switch operation hole 213 (the second switch operation hole 214 or the third switch operation hole 215) of the front cover 209. The cross engaging projection of the operation portion is engaged with the cross groove 219 (220 or 221) of the first switch 210 (the second switch 211 or the third switch 212). Thereafter, the tool is rotated, so that the first switch 210 (the second switch 211 or the third switch 212) is rotated to change the setting.

In the former one of the conventional electronic apparatuses described above, for example, the setting knob member 216 of the first switch 210 is placed in the first switch operation hole 213 so as to forward protrude from the face 209*a* of the front cover 209. Also the setting knob member 217 of the second switch 211 relating to the second switch operation hole 214, and the setting knob member 218 of the third switch 212 relating to the third switch operation hole 215 are placed in a similar manner as the setting knob member 216. Therefore, any one can rotate the setting knob member 216, 217, or 218 to change preset value, irrespective of whether the contents of the work are those allowed to only a specific worker or not. Consequently, such an apparatus has a problem in that it is impossible to prevent a preset value from being intentionally changed.

In the latter one of the conventional electronic apparatuses, the cross groove 219 of the first switch 210 is positioned in the first switch operation hole 213 of the front cover 209, the cross groove 220 of the second switch 211 is positioned in the second switch operation hole 214, and the cross groove 221 of the third switch 212 is positioned in the third switch operation hole 215. Therefore, the cross grooves 219, 220, and 221 can be easily visually recognized from the outside. When a tool having an operation portion the tip end of which has a cross shape is used, therefore, any one (the user or the like) can rotate the setting knob member 216, 217, or 218 to change preset value, irrespective of whether the contents of the work are those allowed to only a specific worker or not. Consequently, also such an apparatus has a problem in that it is impossible to prevent a preset value from being intentionally changed.

The invention has been conducted in view of the above-discussed problems. It is an object of the invention to provide a key protection structure for an electronic apparatus which can prevent a preset value of a switch from being intentionally changed by the user or the like, and which, even when no software exists, can ensure a key protection function by a simple structure.

SUMMARY OF THE INVENTION

In order to attain the object, according to a key protection structure for an electronic apparatus of a first aspect of the invention, in an electronic apparatus in which a switch operation hole corresponding to a switch operation portion of each of switches that are incorporated in a main unit of the apparatus is disposed in the apparatus main unit, and the switch is activated by operating the switch operation portion through the switch operation hole, the switch operation portion is covered by covering means in which covering is cancelled only by a special tool.

According to this configuration, when setting of the switch is once ended, the switch operation portion is covered by the covering means in which the covering is cancelled only by a special tool, whereby the switch can be locked (key-protected) so as not to be externally operated.

Therefore, the preset value can be prevented from being intentionally changed by a person who do not have the special tool, such as the user. Even an electronic apparatus in which software for key protection is not prepared can be provided with a key protection function by a simple structure.

Conventionally, some apparatuses have an input terminal or a switch for activating key protection, and realize a key protection function on the basis of an input operation performed on the terminal or the switch. In this case, such an apparatus requires a dedicated input terminal or switch. According to the invention, such an input terminal or a switch can be eliminated. In some electronic apparatuses; key protection is performed by covering the whole of a front portion by a cover. In this case, there arises a disadvantage that the cover may no t be removed away. According to the invention, it is possible to obtain a structure which can eliminate such a disadvantage and realize also space saving. Furthermore, the key protection level can be changed depending on the kind of the special tool, i.e., a dedicated key.

In order to attain the object, a key protection structure for an electronic apparatus of a second aspect of the invention is configured so that, in the key protection structure for an is electronic apparatus of the first aspect of the invention, the covering of the switch operation portion by the covering means is performed on one or more of the switches which is required to be covered.

According to this configuration, the same effects as the above-described effects of the first aspect of the invention can be attained. Since the covering of the switch operation portion by the covering means is performed only on one or more of the switches which is required to be covered, moreover, the switches can be classified so as to prevent a field worker from erroneously operate the switches. As a result, an operation section which is easy for the worker to operate can be obtained.

In order to attain the object, according to a key protection structure for an electronic apparatus of a third aspect of the invention, in an electronic apparatus in which a switch operation hole corresponding to a switch operation portion of each of switches that are incorporated in a main unit of the apparatus is disposed in the apparatus main unit, and the switch is activated by operating the switch operation portion through the switch operation hole, the structure comprises: a shutter which covers the switch operation hole and cancels the covering; a shutter operation portion which is disposed in the shutter and with which a tool shutter operation portion of a special tool is to be disengeably engaged; and a shutter operation hole which is disposed in the apparatus main unit, which corresponds to the shutter operation portion of the shutter, and into which the special tool is to be inserted.

According to this configuration, when setting of the switch is once ended, the tool shutter operation portion of the special tool is inserted into the shutter operation hole, and the tool shutter operation portion is then engaged with the shutter operation portion of the shutter. Thereafter, the shutter is activated by operating the special tool. The shutter is then moved immediately above the switch to close the switch operation hole, whereby the switch can be locked (key-protected) so as not to be externally operated.

Therefore, the preset value can be prevented from being intentionally changed by a person who do not have the special tool, such as the user. When one or more of the switches is locked by means of the shutter, the switches can be classified so as to prevent a field worker from erroneously operate the switches. As a result, an operation section which is easy for the worker to operate can be obtained. Furthermore, even an electronic apparatus in which software for key protection is not prepared can be provided with a key protection function by a simple structure.

Conventionally, an input terminal or a switch for activating key protection is required. However, such an input terminal or a switch can be eliminated. When key protection is performed by covering the whole of a front portion of an electronic apparatus by a cover, there arises a disadvantage that the cover may not be removed away. According to the invention, it is possible to obtain a structure which can eliminate such a disadvantage and realize also space saving. Furthermore, the key protection level can be changed depending on the kind of the special tool, i.e., a dedicated key.

In order to attain the object, a key protection structure for an electronic apparatus of a fourth aspect of the invention is configured so that, in the key protection structure for an electronic apparatus of the third aspect of the invention, the structure comprises positioning means for positioning the shutter at either of a covering position where the shutter covers the switch operation hole, and a covering canceling position where the shutter does not cover the switch operation hole.

According to this configuration, the same effects as the above-described effects of the third aspect of the invention can be attained. Furthermore, the shutter can be positioned at either of a covering position where the shutter covers the switch operation hole, and a covering canceling position where the shutter separates from the switch operation hole, by the positioning means.

In order to attain the object, a key protection structure for an electronic apparatus of a fifth aspect of the invention is configured so that, in the key protection structure for an electronic apparatus of the third aspect of the invention, the structure comprises moving distance limiting means for limiting a moving distance of the shutter.

According to this configuration, the same effects as the above-described effects of the third aspect of the invention can be attained. Furthermore, the moving distance of the shutter can be regulated by the moving distance regulating means.

In order to attain the object, a key protection structure for an electronic apparatus of a sixth aspect of the invention is configured so that, in the key protection structure for an electronic apparatus of the third aspect of the invention, the shutter operation portion is an engaging portion which has a special shape, and with which the tool shutter operation portion of the special tool is to be disengeably engaged.

According to this configuration, the same effects as the above-described effects of the third aspect of the invention can be attained. Furthermore, the shutter operation portion is an engaging portion which has a special shape, and with which the tool shutter operation portion of the special tool is to be disengeably engaged. Even when an ordinary tool such as a hexagonal wrench is used, therefore, the shutter cannot be activated (rotated). As a result, the switch can be locked (key-protected) so as not to be externally operated.

In order to attain the object, according to a key protection structure for an electronic apparatus of a seventh aspect of the invention, in an electronic apparatus in which an operation section consisting of a switch unit and a front cover is disposed in a main unit of the apparatus, plural switches are disposed by using the switch unit as a base, a switch operation hole corresponding to a switch operation portion of each of the switches is disposed in the front cover, and the switch is activated by operating the switch operation portion through the switch operation hole, the shutter is configured by forming a covering portion at a tip end of a shaft, the covering portion being perpendicular to the shaft, and forming an engaging portion with which a tool shutter operation portion of a special tool is to be disengeably engaged, in a tip end face of the shaft, plural shutter holding cylinders are disposed in a face of the base, a shutter operation hole which corresponds to the engaging portion of each shutter, and into which the special tool is to be inserted is disposed in the front cover, the shutter is disposed on the base while the shaft is inserted into and passed through corresponding one of the shutter holding cylinders, and the engaging portion of the shutter is positioned in the shutter operation hole by superposing the front cover on the switch unit.

According to this configuration, when setting of the switch is once ended, the tool shutter operation portion of the special tool is inserted into the shutter operation hole, and the tool shutter operation portion is then engaged with the engaging portion of the shutter. Thereafter, the shutter is activated by operating the special tool. The covering portion is then moved immediately above the switch to close the switch operation hole, whereby the switch can be locked (key-protected) so as not to be externally operated.

Therefore, the preset value can be prevented from being intentionally changed by a person who do not have the special tool, such as the user. When one or more of the switches is locked by means of the shutter, the switches can be classified so as to prevent a field worker from erroneously operate the switches. As a result, the operation section which is easy for the worker to operate can be obtained. Furthermore, even an electronic apparatus in which software for key protection is not prepared can be provided with a key protection function by a simple structure.

Conventionally, an input terminal or a switch for activating key protection is required. According to the invention, such an input terminal or a switch can be eliminated. In some electronic apparatuses, key protection is performed by covering the whole of a front portion of an electronic apparatus by a cover. In this case, there arises a disadvantage that the cover may not be removed away. According to the invention, it is possible to obtain a structure which can eliminate such a disadvantage and realize also space saving. Furthermore, the key protection level can be changed depending on the kind of the special tool, i.e., a dedicated key.

BEST MODE FOR CARRYING OUT THE INVENTION

Hereinafter, embodiments of the invention will be described with reference to FIGS. 1 to 14 of the accompanying drawings.

Figure 1:
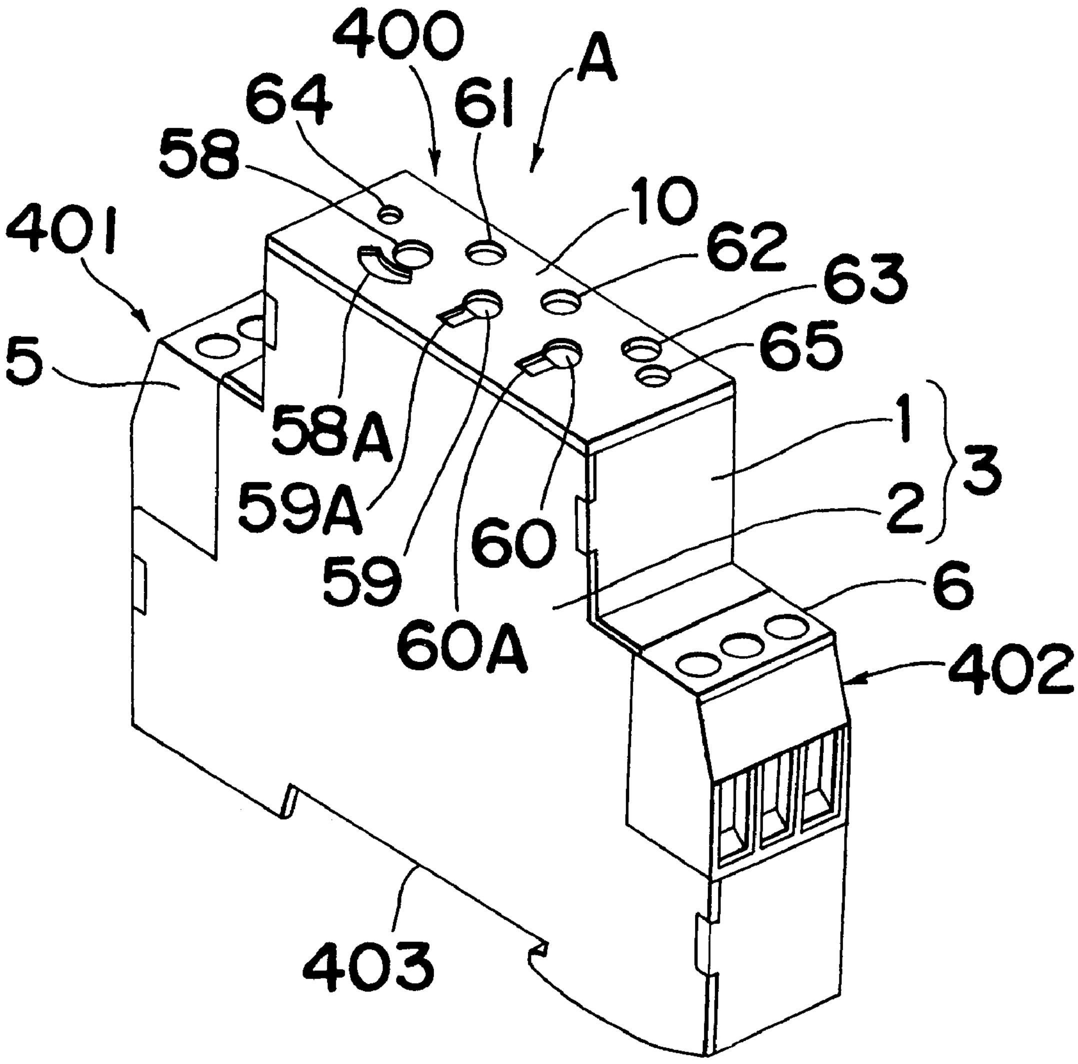
FIG. 1 is a perspective view of an electronic apparatus having the key protection structure of the invention.
Figure 2:
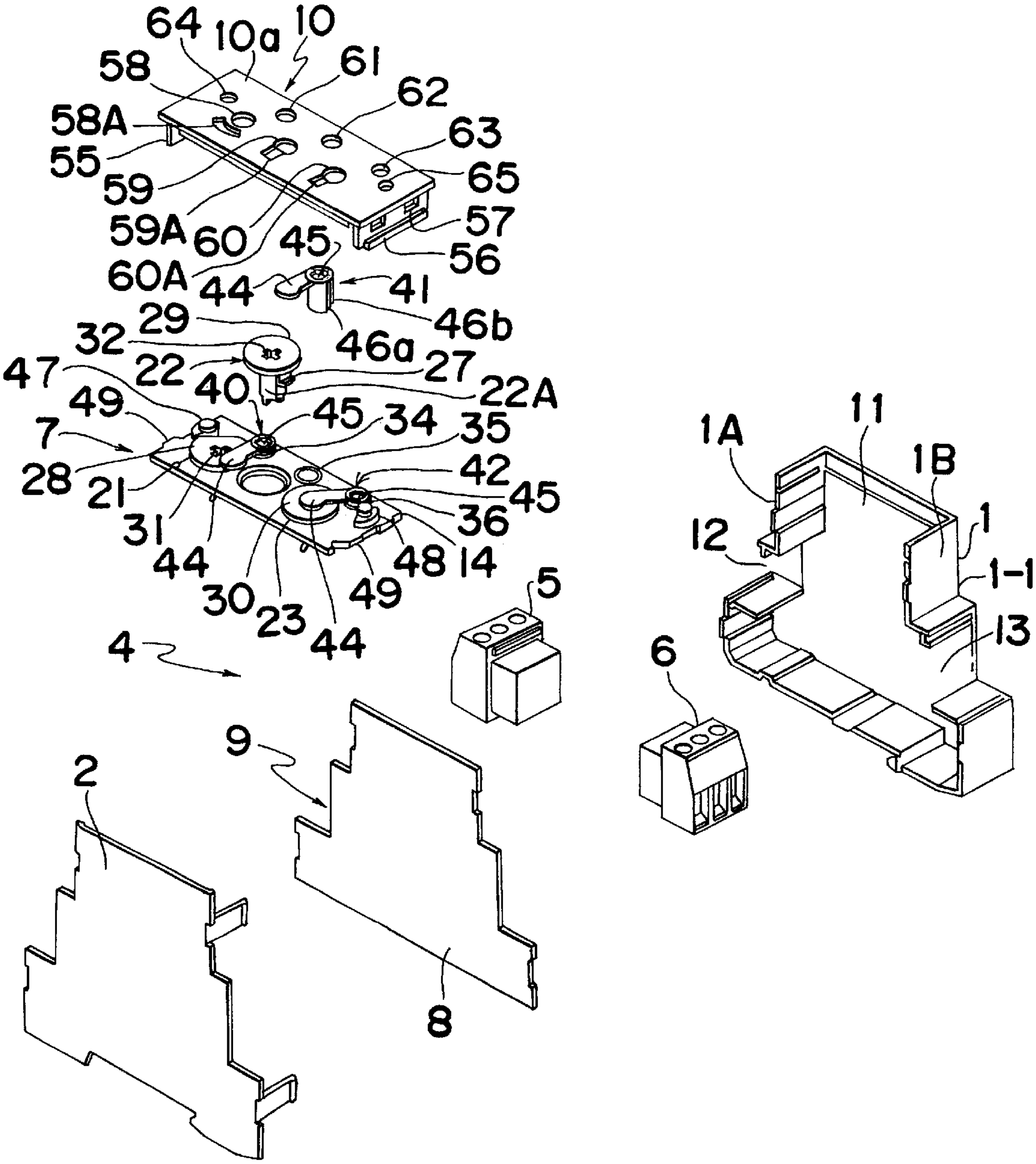
FIG. 2 is a perspective view of an exploded state of the electronic apparatus.

An electronic apparatus A is generally configured by: a case 1; a cover 2; an internal apparatus 4 which is accommodated in a housing 3 consisting of the case 1 and the cover 2; and a front cover 10. The housing 3 and the front cover 10 constitute the main unit of the apparatus. As shown in FIG. 2, the internal apparatus 4 is generally configured by: first and second terminal blocks 5 and 6; a switch unit 7; and a circuit board unit 9 in which many electronic parts are mounted on a printed circuit board 8.

As shown in FIG. 2, the case 1 comprises the case body 1—1 of a substantially quadrangular shape, and a unit mounting portion 11 is formed on the front face of the case body 1—1. A first terminal block mounting portion 12 is formed on a side wall 1A of the case 1, and a second terminal block mounting portion 13 is formed on a side wall 1B of the case 1.

The switch unit 7 and the front cover 10 are mounted on the unit mounting portion 11 of the case 1. The first terminal block 5 is mounted on the first terminal block mounting portion 12, and the second terminal block 6 is mounted on the second terminal block mounting portion 13. The circuit board unit 9 is mounted inside the case 1, and the cover 2 is mounted on the case 1, thereby constituting the electronic apparatus A.

On the front face of the electronic apparatus A, therefore, an operation section 400 (FIG. 1) consisting of the switch unit 7 and the front cover 10 is disposed. Terminal blocks 401 and 402 are disposed on both the sides across the operation section 400, respectively. A rail engaging portion 403 is disposed on the rear face of the electronic apparatus A.

Figure 3:
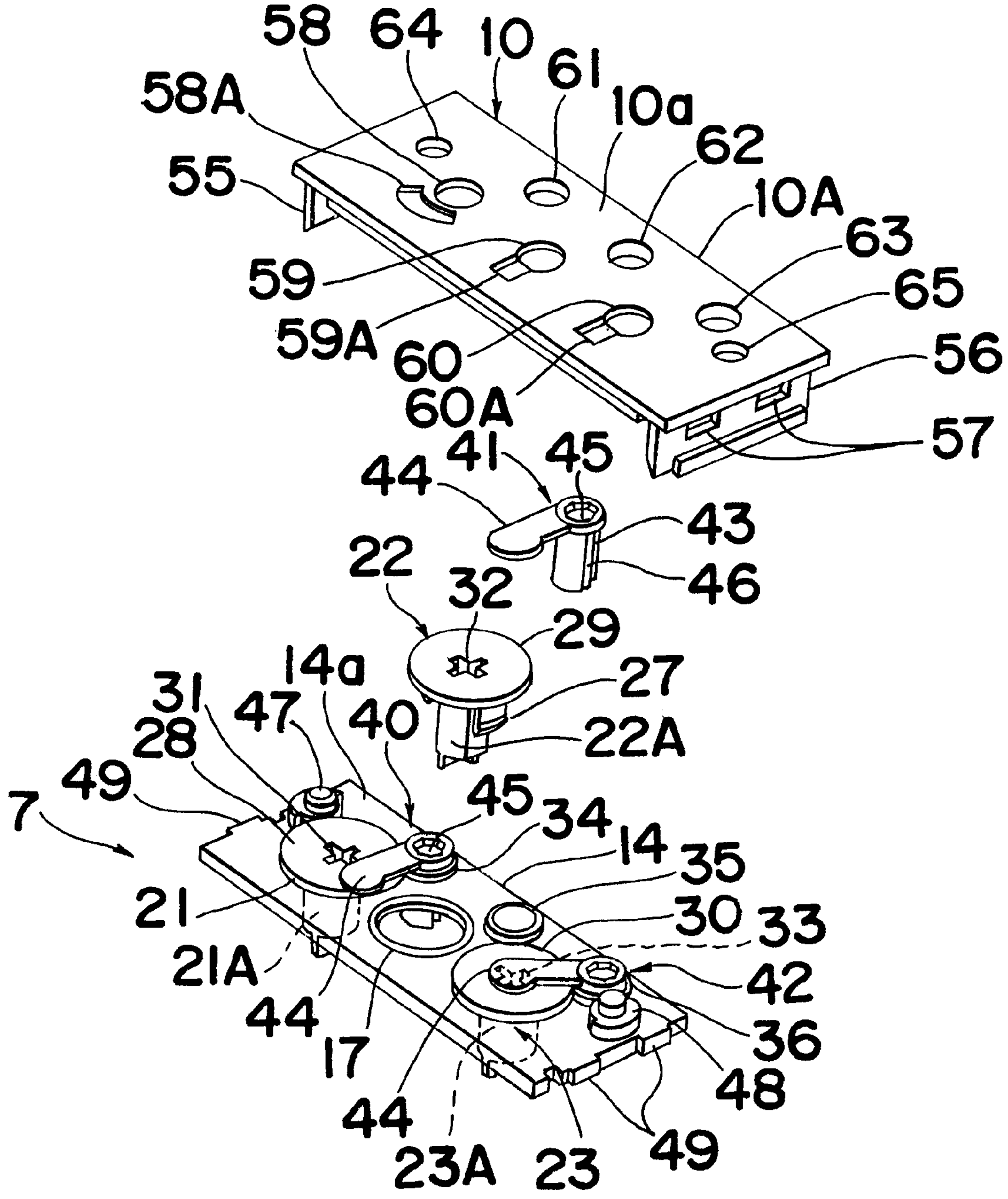
FIG. 3 is a perspective view of an exploded state of an operation section of the electronic apparatus.
Figure 4:
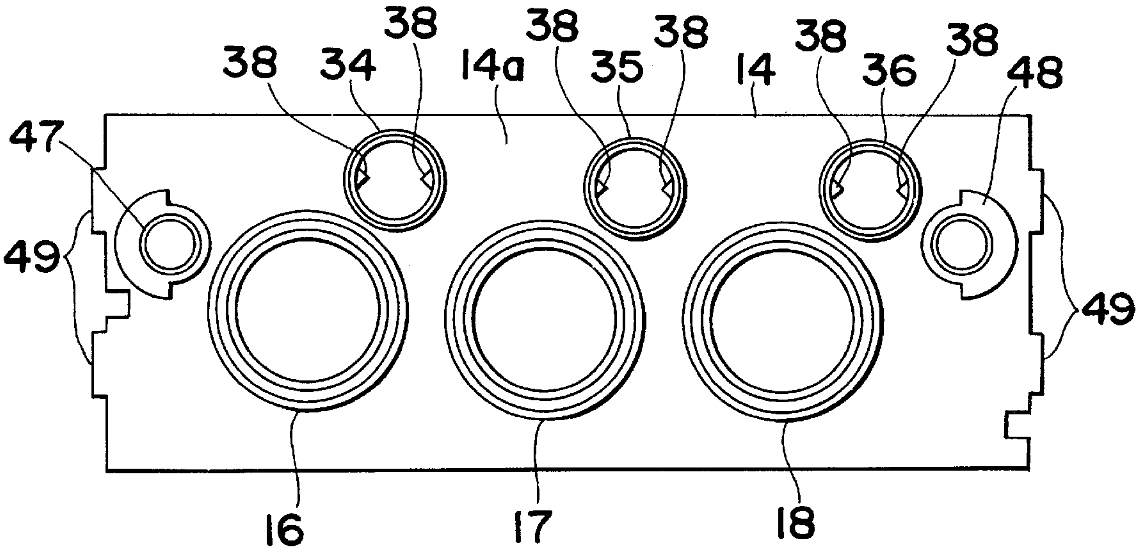
FIG. 4 is a plan view of a base.

As shown in FIGS. 2 and 3, the switch unit 7 comprises a transparent base 14. As shown in FIG. 4, first, second, and third switch holding holes 16, 17, and 18 are disposed in a face 14*a* of the base 14.

As shown in FIG. 3, a switch body 21A of a switch 21 such as a time setting switch is rotatably inserted into and passed through the first switch holding hole 16. A switch body 22A of a switch 22 such as a range setting switch is rotatably inserted into and passed through the second switch holding hole 17. A switch body 23A of a switch 23 such as a mode changeover switch is rotatably inserted into and passed through the third switch holding hole 18.

A hook 27 is formed in the periphery of each of the switch bodies 21A, 22A, and 23A. When the switch bodies 21A, 22A, and 23A are fittingly inserted into the first, second, and third switch holding holes 16, 17, and 18, the hooks 27 are slidingly in contact with the peripheries of the first, second, and third switch holding holes 16, 17, and 18, respectively.

Flange-like knobs 28, 29, and 30 are formed on ends of the switch bodies 21A, 22A, and 23A, respectively. Cross grooves 31, 32, and 33 serving as switch operation portions with which a special tool is to be engaged are formed at the centers of the knobs 28, 29, and 30, respectively.

Figure 5:
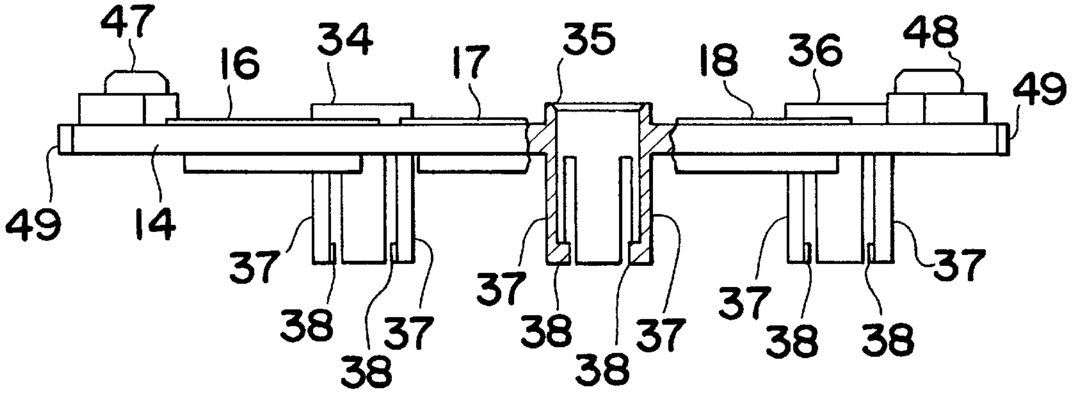
FIG. 5 is a front view of the base, with being partially cut away.

As shown in FIG. 4, first, second, and third shutter holding cylinders 34, 35, and 36 are disposed in the face 14*a* of the base 14 so as to pass threrethrough. In each of the first, second, and third shutter holding cylinders 34, 35, and 36, as shown in FIG. 5, cantilever-like tongue pieces 37 are respectively formed at positions which are opposed to each other. A projection 38 is disposed on the inside of the tip end portion of each of the tongue pieces 37.

As shown in FIG. 3, a first shutter 40 for covering the first switch is rotatably inserted into and passed through the first shutter holding cylinder 34. A second shutter 41 for covering the second switch is rotatably inserted into and passed through the second shutter holding cylinder 35. A third shutter 42 for covering the third switch is rotatably inserted into and passed through the third shutter holding cylinder 36.

Figure 9A:
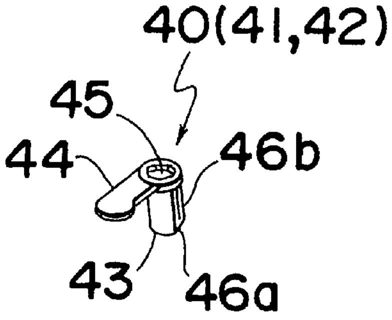
FIG. 9A is a perspective view of a rotated state of a shutter at a covering canceling position.
Figure 9B:
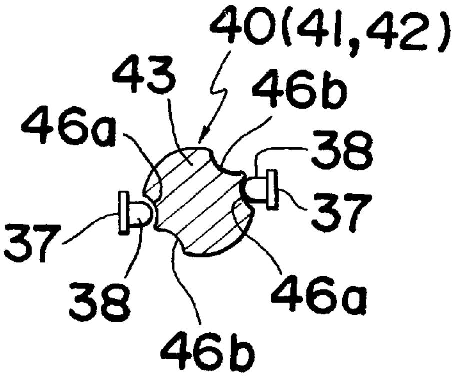
FIG. 9B is a diagram of positioning of the shutter at the covering canceling position.
Figure 10A:
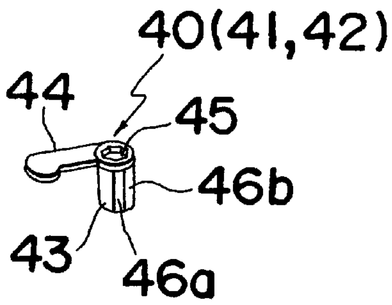
FIG. 10A is a perspective view of a rotated state of the shutter at a covering position.
Figure 10B:
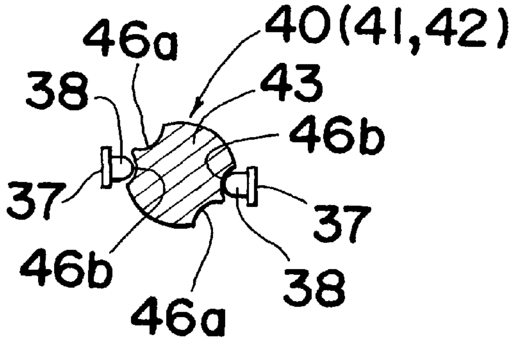
FIG. 10B is a diagram of positioning of the shutter at the covering position.

As shown in FIGS. 9A and 9B, each of the first, second, and third shutters 40, 41, and 42 is configured by disposing a covering portion 44 at the tip end of a shaft 43 so as to be perpendicular to the shaft 43. The tip end portion of each covering portion 44 is made wider. A polygonal (heptagonal) engaging recess 45 serving as a shutter operation portion is formed in the tip end face of the shaft 43. Two pairs of grooves 46*a* and 46*b* elongating in the axial direction of the shaft 43 are formed at positions of the shaft 43 which are opposed to each other, respectively. Each of the first, second, and third shutters 40, 41, and 42 constitutes covering means in which covering is cancelled only by a special tool.

The first shutter 40 is disposed in the base 14 so that the shaft 43 of the shutter is inserted into and passed through the first shutter holding cylinder 34. The second shutter 41 is disposed in the base 14 so that the shaft 43 of the shutter is inserted into and passed through the second shutter holding cylinder 35. The third shutter 42 is disposed in the base 14 so that the shaft 43 of the shutter is inserted into and passed through the third shutter holding cylinder 36. In each of the first, second, and third shutters 40, 41, and 42, as shown in FIG. 9B, the projections 38 of the tongue pieces 37 are disengeably engaged with the grooves 46*a* of the shaft 43, respectively.

Light emitting diode accommodating portions 47 and 48 which protrude to the front side are formed in both the side areas of the base 14, respectively. An engaging projection 49 is disposed in each of the ends of the base 14.

First, second, and third variable resistors (or dip switches and the like) which are not shown, and light emitting diodes (not shown) are mounted on the mounting face of the printed circuit board 8 on which electronic parts are mounted.

The front cover 10 has a cover body 10A. Attachment legs 55 and 56 protrude from both end sides of the rear face of the cover body 10A. Engaging holes 57 are formed in the attachment legs 55 and 56. In the face 10*a* of the cover body 10A, formed are a first switch operation hole 58, an arcuate display window 58A centered at the first switch operation hole 58, a second switch operation hole 59, and a third switch operation hole 60. The second and third switch operation holes 59 and 60 have rectangular display windows 59A and 60A, respectively. Preferably, a transparent plastic plate or the like is fixed to the display windows 58A, 59A, and 60A.

First, second, and third shutter operation holes 61, 62, and 63 which are circular are formed in the face 10*a* of the cover body 10A. Light emitting diode display windows 64 and 65 are disposed in the face 10*a* of the cover body 10A so as to be positioned in both the ends of the face.

The base 14 is attached to the rear side of the front cover 10 while engaging the engaging projections 49 on both the ends with the engaging holes 57 of the attachment legs 55 and 56 of the front cover 10. In this case, the first, second, and third shutters 40, 41, and 42 are slidingly in contact with the rear side of the cover body 110A the front cover 10, whereby the shutters are prevented from slipping off.

Figure 11B:
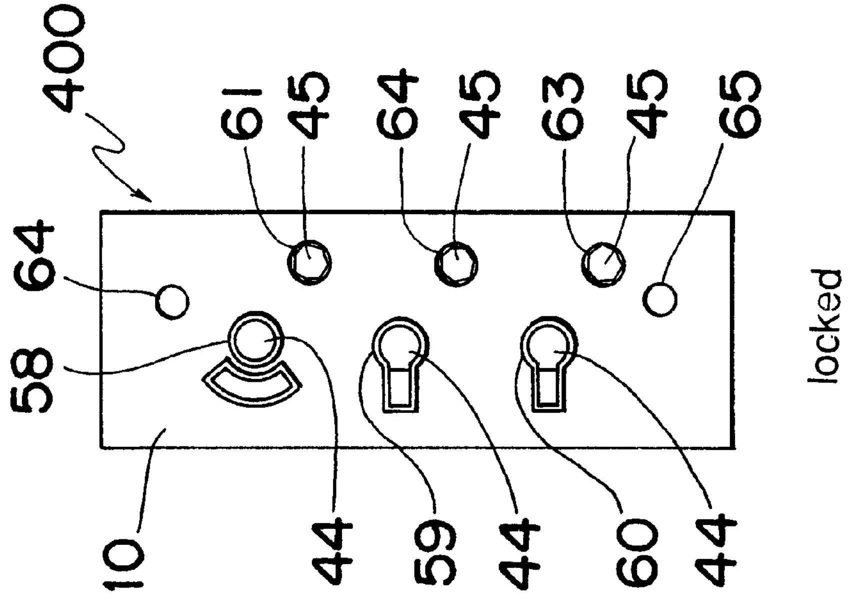
FIG. 11B is a diagram of the operation section after locking (key protecting)
Figure 11A:
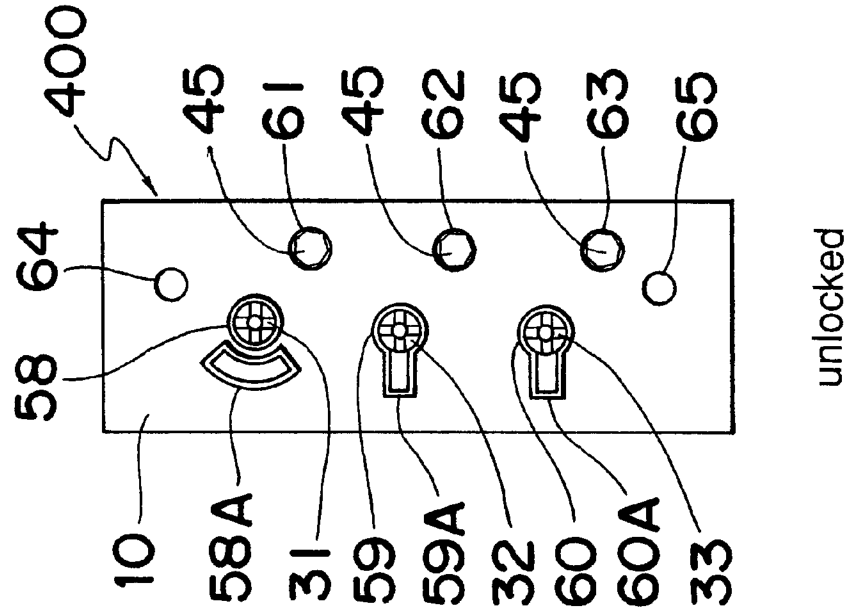
FIG. 11A is a diagram of the operation section before locking (key protecting)

In the front cover 10, as shown in FIG. 11A, the center cross groove 31 of the knob 28 of the first switch 21 is positioned in the first switch operation hole 58. A numeral(s) (not shown) for displaying the time and indicated on the knob 28 is positioned in the display window 58A. The center cross groove 32 of the knob 29 of the second switch 22 is positioned in the second switch operation hole 59. A range setting symbol (not shown) indicated on the knob 29 is positioned in the display window 59A. The center cross groove 33 of the knob 30 of the third switch 23 is positioned in the third switch operation hole 60. A symbol (not shown) indicated on the knob 30 is positioned in the display window 60A.

As shown in FIG. 11B, the polygonal engaging portion 45 of the first shutter 40 is positioned in the first shutter operation hole 61. The polygonal engaging portion 45 of the second shutter 41 is positioned in the second shutter operation hole 62. The polygonal engaging portion 45 of the third shutter 42 is positioned in the third shutter operation hole 63. The light emitting diode accommodating portions 47 and 48 are positioned in the light emitting diode display windows 64 and 65, respectively.

When the switch unit 7 and the front cover 10 are mounted on the unit mounting portion 11 of the case 1, the end portion of the switch body 21A of the first switch 21 is coupled with a movable member of a first volume disposed on the mounting face of the printed circuit board 8. Similarly, the end portion of the switch body 22A of the second switch 22 is coupled with a movable member of a second volume, and the end portion of the switch body 23A of the third switch 23 is coupled with a movable member of a third volume. The light emitting diodes mounted on the mounting face of the printed circuit board 8 are accommodated in the light emitting diode accommodating portions 47 and 48 of the base 14, respectively.

Figure 6:
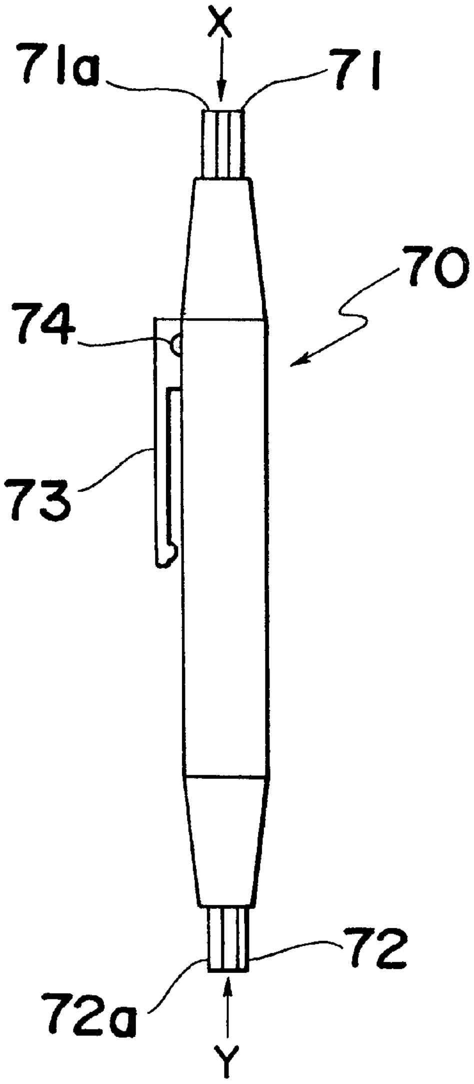
FIG. 6 is a side view of a lock key.
Figure 7A:
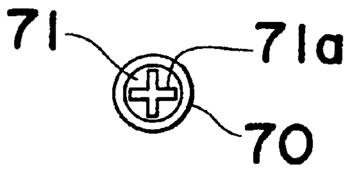
FIG. 7A is a view looking in the direction X of FIG. 6.
Figure 7B:
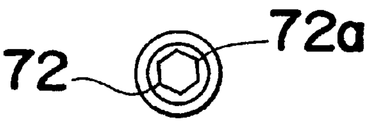
FIG. 7B is a view looking in the direction Y of FIG. 6.
Figure 8:
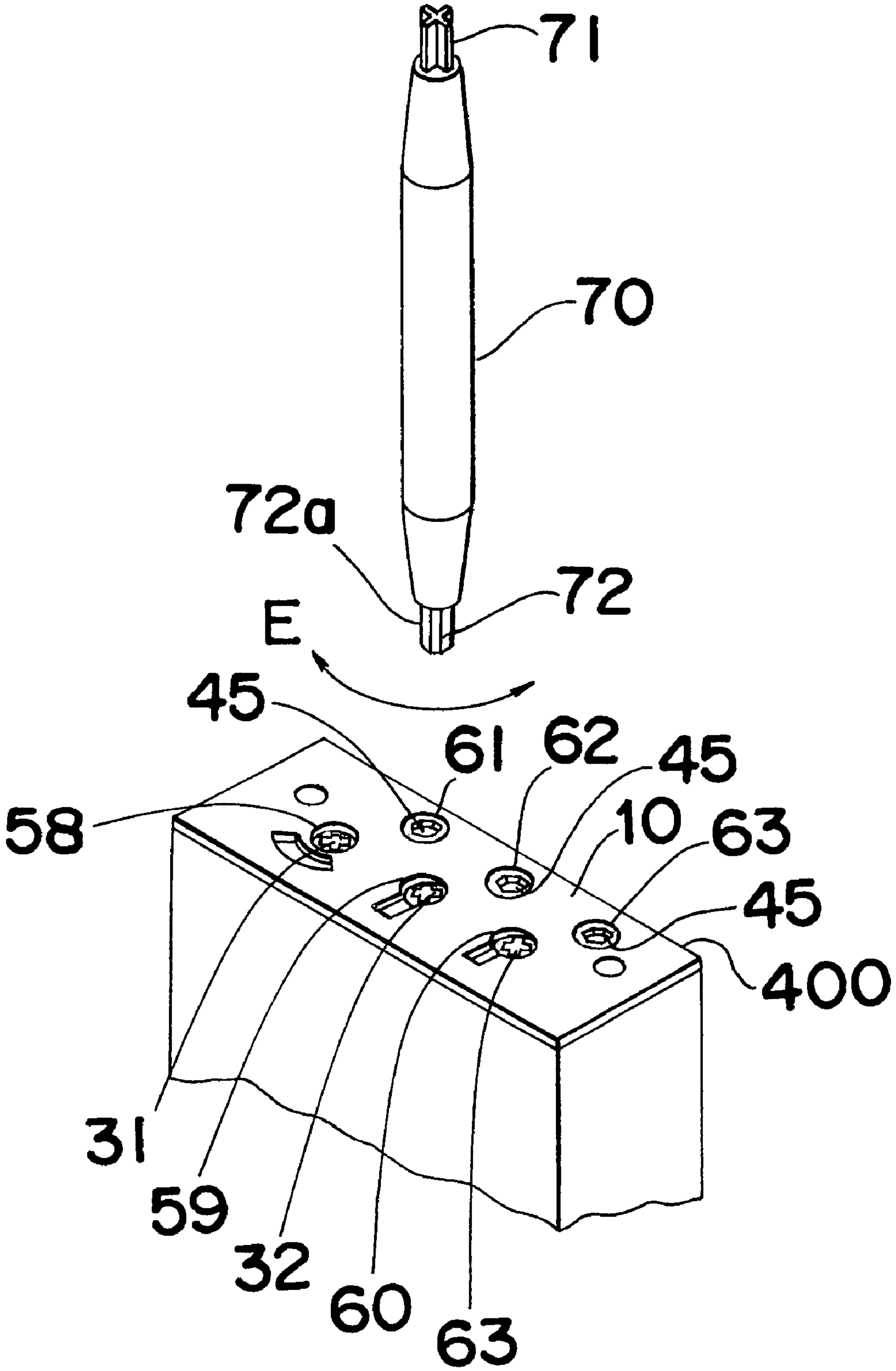
FIG. 8 is a view illustrating a locking (key protecting) operation by using the lock key.

FIGS. 6 and 7 show a lock key 70 serving as a special tool. The lock key 70 has a pen-like shape. A tool switch operation portion 71 having a cross engaging projection 71*a* is disposed in one end portion (upper end portion) of the lock key 70. A tool shutter operation portion 72 having an engaging projection 72*a* of a polygonal prism-like shape (heptagonal prism-like shape) is disposed in the other end portion (lower end portion) of the lock key 70. A clip 73 is attached to the lock key 70. A hole 74 for attaching an anti-loss chain is disposed in the basal portion of the clip 73.

The electronic apparatus A which is configured as described above is attached to a rail member (not shown) by using the rail engaging portion 403 on the rear face.

The worker can set the electronic apparatus A by using the lock key 70 which is possessed by the worker. Specifically, the tool switch operation portion 71 of the lock key 70 is inserted into the first switch operation hole 58 of the front cover 10. The cross engaging projection 71*a* of the tool switch operation portion 71 is engaged with the center cross groove 31 of the knob 28 of the first switch 21. The lock key 70 is then rotated, whereby the first switch 21 is rotated to change the preset time. In this case, the preset time is displayed by a numeral(s) in the display window 58A.

Similarly, the tool switch operation portion 71 of the lock key 70 is inserted into the second switch operation hole 59 of the front cover 10. The cross engaging projection 71a of the tool switch operation portion 71 is engaged with the center cross groove 32 of the knob 29 of the second switch 22. The lock key 70 is then rotated, whereby the second switch 22 is rotated to set the range. In this case, the set range is displayed by the range setting symbol in the display window 59A.

Similarly, the tool switch operation portion 71 of the lock key 70 is inserted into the third switch operation hole 60 of the front cover 10. The cross engaging projection 71a of the tool switch operation portion 71 is engaged with the center cross groove 33 of the knob 30 of the third switch 23. The lock key 70 is then rotated, whereby the third switch 23 is rotated to set the output mode. In this case, the set output mode is displayed by a symbol in the display window 60A.

When settings of the first switch 21, the second switch 22, and the third switch 23 are ended as described above, the tool shutter operation portion 72 of the lock key 70 is inserted into the first shutter operation hole 61. The polygonal engaging projection 72*a* of the tool shutter operation portion 72 is engaged with the engaging recess 45 of the first shutter 40. Thereafter, the lock key 70 is rotated in the right direction E in FIG. 8, whereby the first shutter 40 is rotated as shown in FIGS. 9A to 10B. The covering portion 44 is therefore moved immediately above the first switch 21 to close the first switch operation hole 58, whereby the first switch 21 is locked (key-protected) so as not to be externally operated (see FIGS. 11A and 11B).

Similarly, the tool shutter operation portion 72 of the lock key 70 is inserted into the second shutter operation hole 62. The polygonal engaging projection 72*a* of the tool shutter operation portion 72 is engaged with the engaging recess 45 of the second shutter 41. Thereafter, the lock key 70 is rotated in the right direction E in FIG. 8, whereby the second shutter 41 is rotated from the state of FIG. 9A to that of FIG. 10A. The covering portion 44 is therefore moved immediately above the second switch 22 to close the second switch operation hole 59, whereby the second switch 22 is locked (key-protected) so as not to be externally operated (see FIGS. 11A and 11B).

Similarly, the tool shutter operation portion 72 of the lock key 70 is inserted into the third shutter operation hole 63. The polygonal engaging projection 72*a* of the tool shutter operation portion 72 is engaged with the engaging recess 45 of the third shutter 42. Thereafter, the lock key 70 is rotated in the right direction E in FIG. 8, whereby the third shutter 42 is rotated from the state of FIG. 9A to that of FIG. 10A. The covering portion 44 is therefore moved immediately above the engaging recess 45 of the third switch 23 to close the third switch operation hole 60, whereby the third switch 23 is locked (key-protected) so as not to be externally operated (see FIGS. 11A and 11B).

In a lock canceling position by the first, second, or third shutter 40, 41, or 42, as shown in FIG. 9B, positioning is performed while the projections 38 of the tongue pieces 37 are disengeably engaged with the pair of opposing grooves 46*a* of the shaft 43 of the first, second, or third shutter 40, 41, or 42, respectively. When the first, second, or third shutter 40, 41, or 42 is rotated from the state of FIG. 9A to that of FIG. 10A in order to conduct locking, however, the projections 38 of the tongue pieces 37 are disengaged from the opposing grooves 46*a* of the shaft 43, and then engaged with the other pair of grooves 46*b*. Therefore, the locking by the first, second, or third shutter 40, 41, or 42 is positioned and clicking sensation in the rotational direction is produced. Therefore, the grooves 46*a* and 46*b* of the shafts 43 of the first, second, and third shutters 40, 41, and 42, and the projections 38 of the tongue pieces 37 constitute positioning means.

Figure 12:
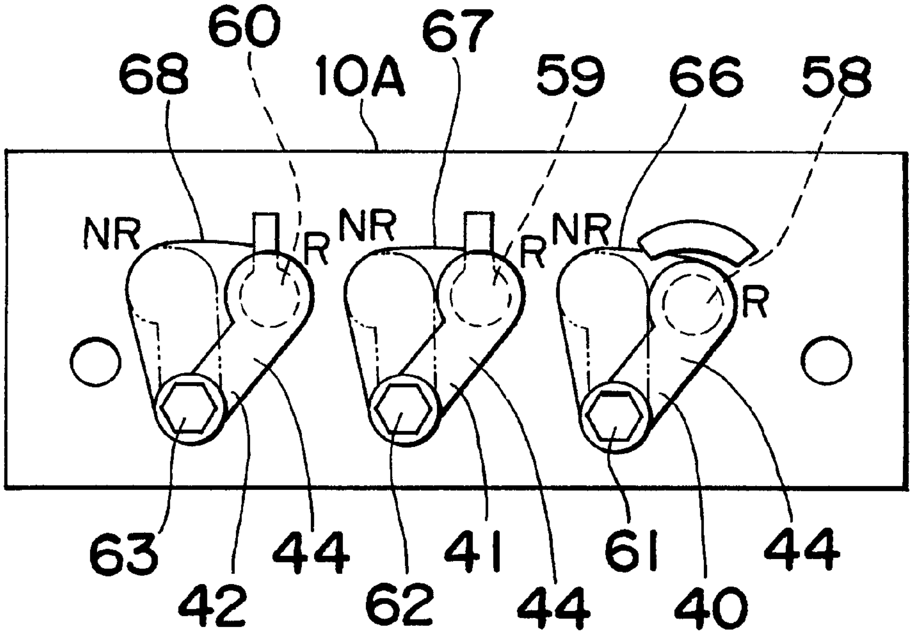
FIG. 12 is a diagram of shutter moving distance regulating means.

As shown in FIG. 12, a first recess 66 which has a fan-like shape and is centered at the first shutter operation hole 61, a second recess 67 which has a fan-like shape and is centered at the second shutter operation hole 62, and a third recess 68 which has a fan-like shape and is centered at the third shutter operation hole 63 may be formed in the rear side of the face 10*a* of the cover body 10A.

In this case, the covering portion 44 of the first shutter 40 is housed in the first recess 66 so as to be swingable within a predetermined angular range, the covering portion 44 of the second shutter 41 is housed in the second recess 67 so as to be swingable within a predetermined angular range, and the covering portion 44 of the third shutter 42 is housed in the third recess 68 so as to be swingable within a predetermined angular range. When the first, second, or third shutter 40, 41, or 42 is swung from the lock canceling position NR to the locked position R, or when the shutter is swung in the opposite direction, the covering portion 44 collides against the wall of the first, second, or third recess 66, 67, or 68. Therefore, the moving distance (angle) can be regulated. As a result, the first, second, and third recesses 66, 67, and 68 constitute moving distance regulating means.

In the embodiment described above, when setting of the first switch 21 (the second or third switch 22 or 23) is ended, the tool shutter operation portion 72 of the lock key 70 is inserted into the first shutter operation hole 61 (the second or third shutter operation hole 62 or 63). The shutter operation portion 72 is then engaged with the engaging recess 45 of the first shutter 40 (the second or third shutter 41 or 42). Thereafter, the lock key 70 is rotated, so that the first shutter 40 (the second or third shutter 41 or 42) is rotated. The covering portion 44 is therefore moved immediately above the first switch 21 (the second or third switch 22 or 23) to close the first switch operation hole 58 (the second or third switch operation hole 59 or 60), whereby the first switch 21 (the second or third switch 22 or 23) can be locked (key-protected) so as not to be externally operated.

Alternatively, the covering operation by a shutter may be performed only on one of the first, second, and third switches 21, 22, and 23 which is necessary to be covered. For example, only the first switch 21 maybe subjected to the covering operation by first shutter 40, and the covering operation by a shutter may not be performed on the second and third switches 22 and 23. When the first, second, and third switches 21, 22, and 23 are classified into those which are to be subjected to the covering operation by a shutter, and those which are not to be subjected to the covering operation by a shutter, it is possible to obtain an operation section which is prevented from being erroneously operated by a field worker, and which is easy for the worker to operate.

Each of the engaging recesses 45 serving as shutter operation portions is formed as a heptagonal recess, and the shutter operation portion 72 of the lock key 70 is formed as the engaging projection 72*a* of a heptagonal prism-like shape. The shapes are not restricted to them. When the shutter operation portion 72 of the lock key 70 has a shape of a cross projection, a triangular prism, a rectangular prism, a pentagonal prism, or the like, for example, the engaging recesses 45 has a shape of a cross groove, a triangular, rectangular, or pentagonal recess, or the like. The engaging recesses 45 serving as shutter operation portions may have any shape as far as the shape is in conformity with the shutter operation portion 72 of the lock key 70.

Alternatively, the engaging recesses 45 serving as shutter operation portions may be formed as engaging projections

Figure 13:
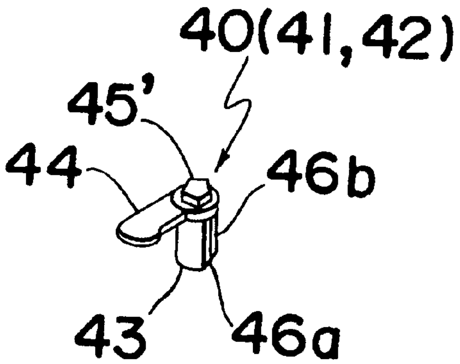
FIG. 13 is a perspective view of the shutter.
Figure 14:
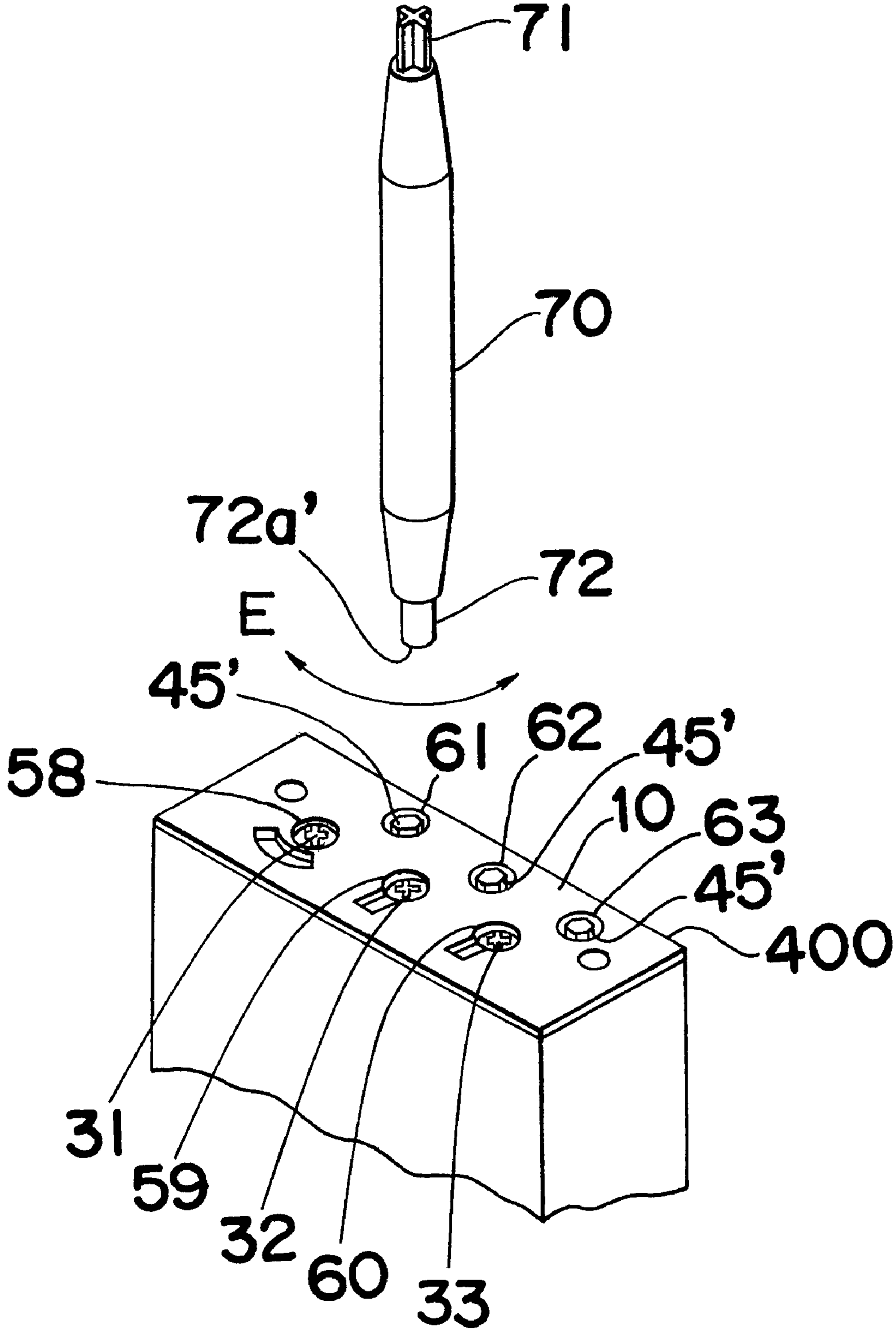
FIG. 14 is a view illustrating the key protecting operation by using the lock key.
Figure 15:
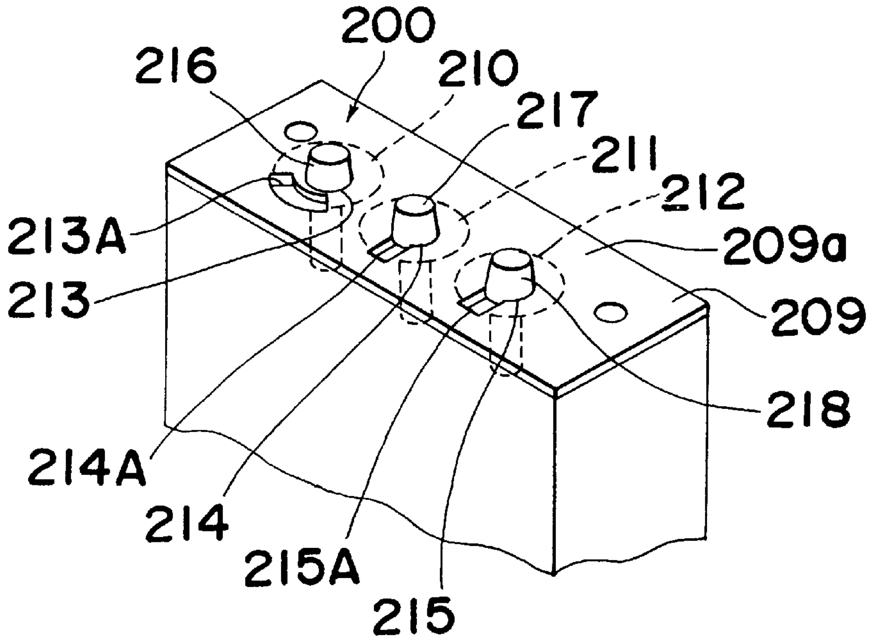
FIG. 15 is a perspective view of an operation section of a conventional electronic apparatus.
Figure 16:
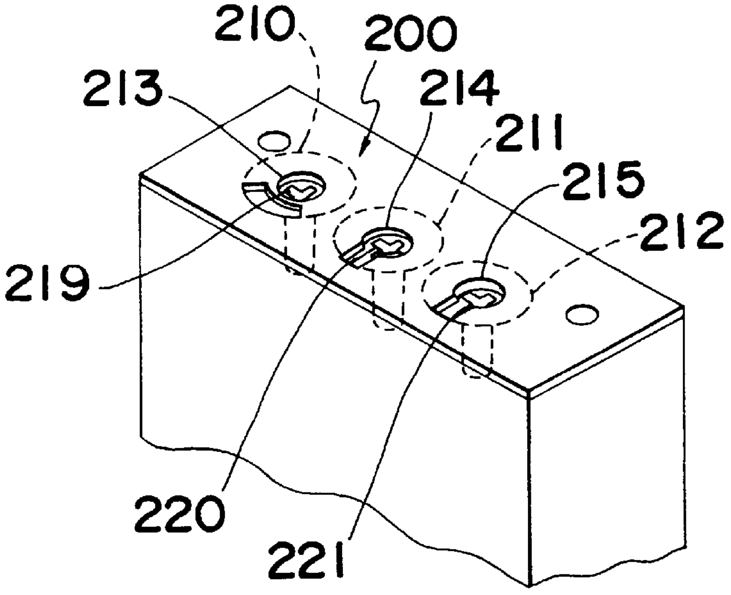
PRIOR ART Fig. 16
FIG. 16 is a perspective view of another operation section of a conventional electronic apparatus.

45' of a polygonal prism-like shape, and the shutter operation portion 72 of the lock key 70 may be formed as a polygonal engaging recess 72*a*' so as to be engageable with the engaging projections 45'. FIGS. 13 and 14 show this example.

In the embodiment described above, the first, second, and third shutters 40, 41, and 42 independently perform the covering operation and the operation of canceling the covering on the first, second, and third switch operation holes 58, 59, and 60. Alternatively, all of or two of the first, second, and third shutters 40, 41, and 42 may be linked with each other via a gear train, and, when one of the shutters is driven, the other shutter(s) maybe activated (rotated) with being interlocked with the operation of the shutter.

What is claimed is:

1. A key protection structure for an electronic apparatus in which a switch operation hole corresponding to a switch operation portion of each of switches that are incorporated in a main unit of said apparatus is disposed in said apparatus main unit, and said switch is activated by operating said switch operation portion through said switch operation hole, wherein said switch operation portion is covered by covering means in which covering is cancelled only by a special tool.

2. A key protection structure for an electronic apparatus according to claim 1, wherein the covering of said switch operation portion by said covering means is performed on one or more of said switches which is required to be covered.

3. A key protection structure for an electronic apparatus in which a switch operation hole corresponding to a switch operation portion of each of switches that are incorporated in a main unit of said apparatus is disposed in said apparatus main unit, and said switch is activated by operating said switch operation portion through said switch operation hole, wherein said structure comprises:

a shutter which covers said switch operation hole and cancels the covering;

a shutter operation portion which is disposed in said shutter and with which a tool shutter operation portion of a special tool is to be engaged; and a shutter operation hole which is disposed in said apparatus main unit, which corresponds to said shutter operation portion of said shutter, and into which said special tool is to be inserted.

4. A key protection structure for an electronic apparatus according to claim 3, wherein said structure comprises positioning means for positioning said shutter at either of a covering position where said shutter covers said switch operation hole, and a covering canceling position where said shutter does not cover from said switch operation hole.

5. A key protection structure for an electronic apparatus according to claim 3, wherein said structure comprises moving distance limiting means for limiting a moving distance of said shutter.

6. A key protection structure for an electronic apparatus according to claim 3, wherein said shutter operation portion is an engaging portion which has a special shape, and with which said tool shutter operation portion of said special tool is to be engaged.

7. A key protection structure for an electronic apparatus in which an operation section consisting of a switch unit and a front cover is disposed in a main unit of said apparatus, plural switches are disposed by using said switch unit as a base, a switch operation hole corresponding to a switch operation portion of each of said switches is disposed in said front cover, and said switch is activated by operating said switch operation portion through said switch operation hole, wherein said shutter is configured by forming a covering portion at a tip end of a shaft, said covering portion being perpendicular to said shaft, and forming an engaging portion with which a tool shutter operation portion of a special tool is to be engaged, in a tip end face of said shaft, plural shutter holding cylinders are disposed in a face of said base, a shutter operation hole which corresponds to said engaging portion of each shutter, and into which said special tool is to be inserted is disposed in said front cover, said shutter is disposed on said base while said shaft is inserted into and passed through corresponding one of said shutter holding cylinders, and said engaging portion of said shutter is positioned in said shutter operation hole by superposing said front cover on said switch unit.

* * * * *